United States Patent [19]

Koga

[11] Patent Number: 4,562,468
[45] Date of Patent: Dec. 31, 1985

[54] ADAPTIVE PREDICTIVE CODING APPARATUS OF TELEVISION SIGNAL

[75] Inventor: Toshio Koga, Tokyo, Japan
[73] Assignee: NEC Corporation, Tokyo, Japan
[21] Appl. No.: 493,974
[22] Filed: May 12, 1983
[30] Foreign Application Priority Data May 14, 1982 [JP] Japan .................................. 57-80923

[51] Int. Cl.[4] .............................................. H04N 7/13
[52] U.S. Cl. ..................................... 358/136; 358/135; 375/27
[58] Field of Search ............... 358/133, 135, 136, 138, 358/105; 375/27, 28

[56] References Cited

U.S. PATENT DOCUMENTS 4,023,199 5/1977 Netravali ............................. 358/135
4,141,034 2/1979 Netravali ............................. 358/135
4,307,420 12/1981 Ninomiya .
4,371,895 2/1983 Koga ................................... 358/136
4,491,953 1/1985 Bellisio ................................ 358/135

Primary Examiner—Howard W. Britton
Attorney, Agent, or Firm—Blakely, Sokoloff, Taylor & Zafman

[57] ABSTRACT

In an adaptive predictive coding apparatus for coding an input television signal so as to perform predictive coding by determining an optimum prediction function among a plurality of prediction functions for each of a plurality of blocks obtained by dividing up a frame of the input television signal, each of the blocks having a plurality of picture elements, and to perform selection of quantizing characteristic and coding control such as subline and subsample coding, data necessary for representing a given prediction function of the plurality of prediction functions and data necessary for representing a prediction error amount per the block for the given prediction function are evaluated. Sums of evaluated data are compared to produce, on a block by block basis, one of the prediction functions which provides a minimal sum as an optimum prediction function.

6 Claims, 7 Drawing Figures

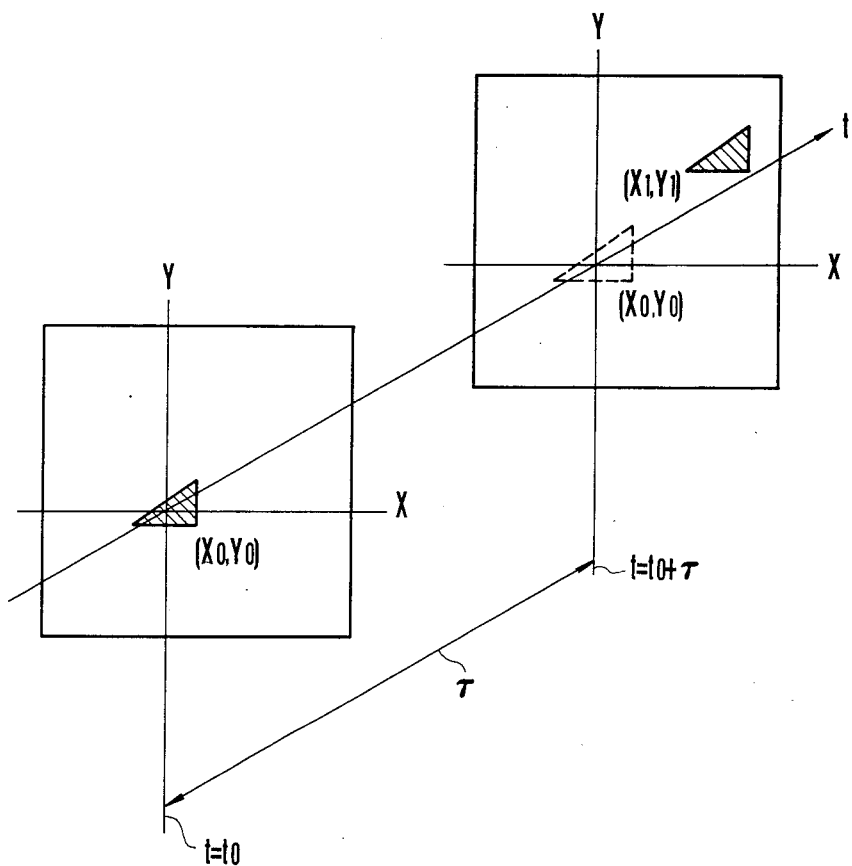
F I G. 1

ADAPTIVE PREDICTIVE CODING APPARATUS OF TELEVISION SIGNAL

BACKGROUND OF THE INVENTION

I. Field of the Invention

The present invention relates to a predictive coding apparatus of a television signal. More particularly, the present invention relates to an adaptive predictive coding system wherein a differential signal (i.e., prediction error signal) between a signal to be transmitted and a prediction signal is encoded to decrease the number of bits of data to be transmitted, and an optimum prediction function among a plurality of predictive functions is selected to provide a minimum data quantity for transmission.

II. Description of the Prior Art

Conventionally, in an interframe coding system, a prediction error signal having a large amplitude does not often occur in a still image or a quasi-still image with little motion, so that a total amount of data is small. However, the total amount of data is increased in a moving picture. A picture having little motion can be effectively transmitted by a small amount of data, whereas a moving picture must be transmitted with a great amount of data. An attempt has been made to improve transmission efficiency of a moving picture. For example, movements of a picture which are indicated by television signals are often regarded as translational displacements. Therefore, an interframe prediction (motion-compensated interframe prediction) method is proposed to compensate for the motion in accordance with the translational displacement of an object on the screen. This system is the most effective method of achieving a high coding efficiency for a moving picture.

In the motion-compensated interframe prediction system of this type, a plurality of prediction functions are used to keep coding efficiency high with respect to various types of motion. The plurality of prediction functions, which correspond to motion at various speeds and in various directions, are prepared, and the most suitable prediction function for an actual motion is defined as an optimum prediction function. In general, the optimum prediction function minimizes a prediction error. In this sense, the optimum prediction function is referred to as a motion vector hereinafter. Therefore, the motion-compensated interframe prediction system can be regarded as an optimum predictive coding system for determining the optimum prediction function (motion vector) among a plurality of prediction functions.

Conventionally, a considerably high transmission rate is adopted, so that motion vector data occupies only a slight portion of data to be transmitted and can be neglected. It has been considered that optimum prediction can be performed to decrease a total amount of transmission data by detecting the motion vector for minimizing the prediction error data amount. However, when the transmission rate is decreased, the motion vector data occupies a relatively large portion of the data to be transmitted and can no longer be neglected.

Furthermore, in the conventional practical coding apparatus, various types of coding or digitizing operations are performed to suppress rapid change of the amount of data generated even if the picture contents of the input television signals change. For example, a television signal to be coded is subsampled or subline coded. A plurality of quantization characteristics which comprise either a great number of quantization levels or a small number thereof are adaptively selected in accordance with the picture contents. In this case, the relationship between the prediction errors occurring in respective coding control modes and required amounts of data varies in the respective coding control modes. As a result, the proper amount of data cannot be calculated, thus impairing detection of correct motion vector.

SUMMARY OF THE INVENTION

It is, therefore, an object of the present invention to provide an adaptive predictive coding apparatus for coding a television signal with a high coding efficiency, wherein prediction function data and prediction error data obtained by the prediction function data are used to detect a motion vector, thereby minimizing a total amount of the prediction function and prediction error data to be transmitted, which sum changes in accordance with a given coding control mode.

In order to achieve the above object of the present invention, there is provided an adaptive predictive coding apparatus for coding an input television signal so as to perform predictive coding by determining a motion vector among a plurality of prediction functions for each of a plurality of blocks obtained by dividing up a frame of the input television signal, each of the blocks having a plurality of picture elements, and to perform selection of quantizing characteristic and coding control such as subline and subsample coding, characterized in that the apparatus comprises:

first evaluating means for evaluating data necessary for representing a given prediction function of said plurality of prediction functions;

second evaluating means responsive to the coding control, for evaluating data necessary for representing a prediction error amount per the block for the given prediction function;

optimum prediction function output means comparing sums of evaluated data produced from said first and second evaluating means, in respect of at least a portion of said plurality of prediction functions, for producing, on a block by block basis, one of the prediction functions which provides a minimal sum as an optimum prediction function;

prediction coding means for effecting predictive coding in accordance with the optimum prediction function to produce a prediction error; and compressor means for compression coding at least a data containing the data representative of said optimum prediction function and data representative of the prediction error produced from said prediction coding means in accordance with said optimum prediction function.

According to the present invention, a required amount of data which indicates a given prediction function so as to obtain the corresponding prediction error using the given prediction function can be expressed by a code length. Furthermore, an amount of data in a block which includes the prediction error with respect to the given prediction function can also be expressed by a code length. Therefore, the motion vector can be detected on the basis of the code lengths.

When a picture is subsampled or a line to be coded is subline coded, the amount of data of the prediction error is evaluated only for the pixel coded accordingly.

Alternatively, when a plurality of quantization characteristics are used, a relationship between a prediction error corresponding to each characteristic and a code length required for expressing the prediction error is properly determined in accordance with a selected one of the plurality of quantization characteristics. A sum of the amount of the prediction error data (code length) and the code length required for expressing the corresponding prediction function is defined as a total amount of data required at the time when this prediction function is used.

A sum of the code lengths for any other prediction function can be obtained in the same manner as described above. The sum of the code lengths of one prediction function and its corresponding prediction error is compared with that of another prediction function. If the sum of the code lengths of one prediction function and its corresponding prediction error has a minimum value, this prediction function is defined as the motion vector. The amount of data required to be transmitted in consideration of the motion vector can be properly determined, unlike in the conventional prediction system wherein the motion vector can be determined only by the prediction error signal. Furthermore, the motion vector is determined such that the sum data is minimized, so that the total amount of data required for transmission is always minimized.

As may be apparent from the above description, since the prediction function data and the prediction error data are used to determine the motion vector according to the present invention, the coding efficiency can be increased when the data transmission rate is low. Therefore, the present invention is very effective in the case wherein the television signal is compressed, coded and transmitted at a low transmission rate.

BRIEF DESCRIPTION OF THE DRAWINGS

FIG. 1 is a schematic view showing the principle of "motion compensation" in a motion-compensated interframe prediction system;

DETAILED DESCRIPTION OF THE PREFERRED EMBODIMENT

Figure 2:
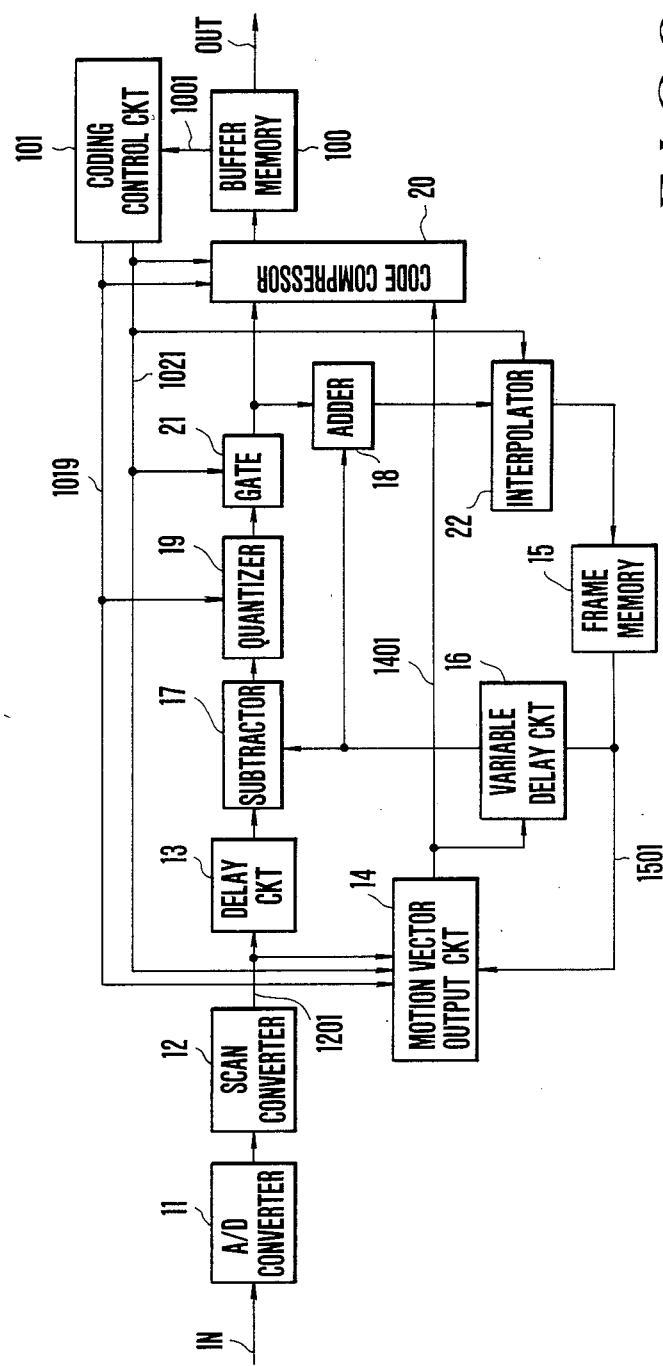
FIG. 2 is a block diagram of an adaptive predictive coding apparatus according to an embodiment of the present invention.

In order to best understand the present invention, the principle and application of motion compensation will be described before a preferred embodiment of the present invention is described.

First, the principle of motion compensation will be briefly described. As shown in FIG. 1, a figure located in the vicinity of point (x0, y0) at time t0 is displaced to point (x1, y1) at time t0+τ (where τ is one frame period). In this case, according to a simple correlation between two adjacent frames (simple interframe prediction), an immediately preceding frame picture element or pixel is used as a prediction signal, so that a picture element of the figure in the vicinity of point (x0, y0) at time t0 is used to predict a corresponding picture element of the figure in the vicinity of point (x0, y0) at time t0+τ. Therefore, as may be apparent from FIG. 1, a prediction error which is not substantially zero occurs when the figure is displaced from point (x0, y0) to (x1, y1) at time t0+τ.

Now assume that a displacement of the figure from point (x0, y0) to point (x1, y1) is detected by a given technique. The location of the figure in the vicinity of point (x1, y1) at time t0+τ can be predicted using the figure located in the vicinity of point (x0, y0) at time t0, thereby greatly decreasing the total amount of data. This is the principle of motion compensation.

As a system for detecting the displacement (i.e., an optimum prediction system), a motion-compensated interframe coding system is disclosed in U.S. Pat. No. 4,307,420 by Ninomiya et al. filed on June 2, 1980. According to this system, prediction errors obtained by various prediction functions respectively corresponding to various shift vectors are compared on a block by block basis. A shift vector corresponding to a given prediction function indicating a minimum prediction error is regarded as a motion vector (optimum prediction function). If motion compensation or correction is applied to the motion of a picture, the total amount of data required for coding is decreased or compressed to be half of that when the interframe coding system is applied.

According to the present invention, at least the motion vector data and the corresponding prediction error data are transmitted. In other words, at least the motion vector data and the prediction error data obtained by performing motion compensation in accordance with the motion vector data are transmitted.

The ratio of code data which is required to express the motion vector (i.e., motion vector data) to the total transmission data greatly varies in accordance with the transmission rate of a transmission line. The motion vector data ratio is very small with respect to the total transmission data when the transmission rate is very high and several bits can be assigned to each picture element. However, when the transmission rate is low, 50%, for example, of the total transmission data may be motion vector data. Hirano et al. reported in "Study on Block Size in Motion-Compensated Interframe Coding", Lecture No. 697 of National Meeting of the Field of the Institute of Electronics and Communications Engineers of Japan, 1980, that the amount of motion vector data may be measured for individual picture elements. According to this report, the entropy of the motion vector which is used as a criterion for the motion vector data is measured to be 0.1 bit/pixel when a block having a plurality of picture elements or pixels comprises a size of 4 lines ×8 pixels. This value is obtained when the sampling frequency is 8 MHz, so that the motion vector data occurs at a rate of 0.8 Mbit/sec. For example, if the television signal is transmitted at a transmission rate of 1.5 Mbits/sec, more than 50% of the total transmission data comprises the motion vector data.

As previously described, when the preceding motion vector data and the corresponding prediction error data are used to determine the present motion vector data, the coding efficiency is greatly improved.

An adaptive predictive coding apparatus according to an embodiment of the present invention will now be described with reference to the accompanying drawings.

FIG. 2 is a block diagram of the adaptive predictive coding apparatus according to the embodiment of the present invention. Referring to FIG. 2, an analog television signal supplied to an input line IN is supplied to an analog-to-digital converter (to be referred to as an A/D converter) 11. The analog signal is converted by the A/D converter 11 to a digital signal. The picture elements indicated by the digitl television signal are respectively assigned by a scan converter 12 to a plurality of blocks obtained by dividing up one frame, such that that each block comprises a plurality of picture elements. The scan converter is detailed in U.S. Pat. No. 4,371,895 by Koga filed on Jan. 15, 1981. If the block comprises a one-dimensional block along the horizontal scanning line, the scan converter 12 need not be used. However, if the block comprises a two-dimensional block which extends along both horizontal and vertical scanning lines, the scan converter 12 cannot be omitted. In this embodiment, the two-dimensional block is employed. The television signal which is scanned and converted (to be referred to as a picture signal hereinafter) is supplied to a delay circuit 13 and a motion vector output circuit (optimum prediction function output circuit) 14 through a signal line 1201. The motion vector output circuit 14 receives the picture signal (to be coded) supplied from the signal line 1201 and also an about one-frame delayed picture signal supplied from a frame memory 15 thereto through a signal line 1501. The motion vector output circuit 14 then detects a motion vector indicating the optimum prediction function for each block based on these input signals. The operation of the motion vector output circuit 14 will be described in detail later. The detected motion vector signal is then supplied to a code compressor 20 and a variable delay circuit 16 through a signal line 1401. The variable delay circuit 16 is also detailed in U.S. Pat. No. 4,371,895. The variable delay circuit 16 produces a prediction signal in accordance with the motion vector signal supplied through the signal line 1401 and the picture signal from the frame memory 15 supplied through the signal line 1501. The prediction signal is then supplied to a subtractor 17 and an adder 18. The delay circuit 13 delays the picture signal appearing on the signal line 1201 by a period required for detecting the motion vector signal in the motion vector output circuit 14 and generating the prediction signal. The subtractor 17 subtracts the prediction signal from the output signal from the delay circuit 13 and produces a prediction error signal corresponding to a difference between the prediction signal and the delayed signal. The prediction error signal is quantized by a quantizer 19 which has a plurality of quantization characteristics, so that the level of the digitized prediction error signal is appropriately limited. The quantizer 19 comprises a read-only memory (ROM). The selection of the quantization characteristic is performed in accordance with a selection signal supplied to the quantizer 19 through a signal line 1019. The output signal from the quantizer 19 is supplied to a gate 21. The gate 21 performs subsample coding of a picture element or subline coding of a scanning line along the horizontal or vertical scanning direction in response to a gate signal supplied thereto through a signal line 1021. An output signal from the gate 21 is supplied to the adder 18 and the code compressor 20. The adder 18 adds the quantized prediction error signal and the output signal (prediction signal)
from the variable delay circuit 16 and produces a local decoding signal.

The local decoding signal is supplied to an interpolator 22. The interpolator 22 interpolates the picture element or scanning line when subsample or subline coding is specified by a signal on the line 1021. Otherwise, the interpolator 22 does not perform interpolation. An output signal from the interpolator 22 is supplied to the frame memory 15 which then delays the signal by about one frame. When the motion vector is zero, the sum of delay amounts of the frame memory 15 and the variable delay circuit 16 is exactly equal to one frame. The delay by the frame memory 15 is thus slightly smaller than one frame. As described above, the about one-frame delayed signal is supplied to the motion vector output circuit 14 and the variable delay circuit 16. The code compressor 20 comprises, for example, a variable length encoder. The code compressor 20 effectively compresses and encodes the quantized prediction error signal and the motion vector signal in accordance with variable length coding.

Codes of the coding control mode which indicate an operating state of the selection signal supplied through the line 1019 and the gate signal supplied through the line 1021 and of the horizontal and vertical sync signals are added by the code compressor 20. The picture signal compressed by the code compressor 20 is supplied to a buffer memory 100. The buffer memory 100 serves to match an input rate of the picture signals irregularly generated from the code compressor 20 with a transmission rate of the picture signal onto the transmission line. The matched output signal from the buffer memory 100 is transmitted to the transmission line or a recording medium through an output line OUT. The selection of subsample, subline, and quantization characteristic is performed in accordance with the amount of data stored in the buffer memory 100 (i.e., occupancy of the buffer memory 100). The coding control circuit 101 continually supervises the occupancy of the buffer memory 100. The occupancy is computed by a difference between counts of the read and write counters. A signal representative of the occupancy is fed via line 1001 to the coding control circuit 101. The selection signal and the gate signal are generated to control coding in accordance with the relationship between a predetermined occupancy of the buffer memory and the coding control mode.

The operation of the motion vector output circuit 14 will be described in detail with reference to FIG. 3. The picture signal from the signal line 1201 and the about one-frame delayed picture signal from the signal line 1501 are supplied to a prediction error data amount generator 141. The prediction error data amount generator (i.e., second evaluating means) 141 receives various prediction function data (to be simply referred to as the prediction function hereinafter) supplied from a sequencer 142 through a signal line 1421. The sequencer comprised of a counter and a ROM, for example, produces vector outputs in predetermined sequence. The prediction error data amount generator 141 generates the amount of prediction error data for the block which corresponds to the given prediction function in response to the selection signal and the gate signal. The selection signal and the gate signal are supplied to the prediction error data amount generator 141 through the lines 1019 and 1021, respectively. The prediction error data amount signal is then supplied to an adder 143 through a signal line 1411. The prediction error data amount generator 141 will be described in detail later. The prediction function produced from the sequencer 142 is also supplied to a selector 144 and a vector code length generator (first evaluating means) 145 as well as to the prediction error data amount generator 141. The vector code length generator 145 produces predetermined code length data to the adder 143 so as to express the supplied prediction function.

A vector code length is described in detail hereinafter. In general, the motion vector is most frequently obtained corresponding to a simple interframe prediction signal, so that the motion vector data is defined as the shortest code (code length of 1) showing no movement. Variable length coding such as modified Huffman coding is applied to a shortest code string (i.e. run), the mean code length per motion vector being far smaller than that per one picture element. Therefore, the code length for the prediction function which indicates the simple interframe prediction is approximately zero in the vector code length generator 145. A longer code is used to express a prediction function except for interframe prediction when the prediction function greatly differs from interframe prediction. For example, a 4-bit code is assigned to a prediction function whose picture element is spatially offset by one picture element from the corresponding picture element of the interframe prediction signal in any one of the four directions (i.e., up, down, left, right). A 5-bit code is assigned to a prediction function whose picture element is spatially offset by one picture element from the corresponding picture element of the interframe prediction signal in both an upper or lower direction and a right or left direction. A 6-bit code is assigned to a prediction function whose picture element is spatially offset by two picture elements from the corresponding picture element of the interframe prediction signal in any one of the four directions. The longer codes are thus assigned to corresponding prediction functions, respectively.

The adder 143 adds the code length data representative of a prediction function and the data amount of prediction error data of a block at the time when this prediction function is used. Sum data is then supplied from the adder 143 to the selector 144. The selector 144 comprises a register and a comparator. The selector 144 compares the present sum data with preceding sum data. If the present sum data is determined by the selector 144 to be minimum, the selector 144 holds as the present optimum prediction function (motion vector) the prediction function supplied through the signal line 1421. However, if the present sum is not determined to be minimum, the preceding sum data is held as the present optimum prediction function which is contantly supplied to a vector output register 146. The vector output register 146 supplies the present optimum prediction function (i.e. motion vector) onto the signal line 1401 in accordance with a timing signal which is supplied from the sequencer 142 through the signal line 1422 at the termination of a block. The motion vector thus determined is the output signal from the motion vector output circuit 14.

The prediction error data amount generator 141 will be described in detail with reference to FIG. 4. The picture signal scanned and converted by the scan converter 12 is supplied to a parallel output circuit 41 through the line 1201. The parallel output circuit 41 simultaneously produces picture element data included in one block. Assume that a given block comprises 8 picture elements (= 4 picture elements ×2 lines) before conversion is peformed, as shown in FIG. 5. In this condition, picture elements a, b, c, d, e, f, g and h are simultaneously supplied to subtractors 61 to 68 through signal lines 4101 to 4108, respectively. Eight variable delay circuits 51 to 58 produce outputs in response to the prediction function corresponding to all the picture elements in the given block, respectively, in accordance with the prediction function supplied through the signal line 1421. Assume that this prediction function is defined as $\vec{V}$ as shown in FIG. 6. The picture elements in this block are offset from those (indicated by the hatched portion) of the interframe prediction signal by one picture element to the right and three picture elements upward. The prediction signals are subject to quantization noises and expressed as $\hat{a}, \hat{b}, \hat{c}, \hat{d}, \hat{e}, \hat{f}, \hat{g}$ and $\hat{h}$ in accordance with the prediction function $\vec{V}$. When the variable delay circuits 51 to 54 and 55 to 58 produce the prediction signals corresponding to the picture elements from the upper left corner to the upper right corner and from the lower left corner to the lower right corner, respectively, they produce prediction signals $\hat{a}$ to $\hat{d}$ and $\hat{e}$ to $\hat{h}$ with respect to the prediction function $\vec{V}$, respectively. The about one-frame delayed picture signal from the frame memory 15 through the signal line 1501 and the prediction function supplied from the sequencer 142 through the line 1421 are commonly supplied to the variable delay circuits 51 to 58. The subtractors perform subtractions $(a-\hat{a})$ to $(h-\hat{h})$. The obtained difference signals are then supplied to code length generators 71 to 78, respectively. The difference signals are then converted to code length signals, respectively.

The relationship between the difference and the code length mainly depends on the quantization characteristics for the difference (i.e., on the number of quantization levels). Therefore, when a plurality of quantization characteristics having different quantization levels are provided and when a set of code lengths is predetermined corresponding to each characteristic, and a proper set of code lengths is selected in accordance with the quantization characteristic selected by the quantizer 19, the amount of code length data can always be converted to a proper total code length. This selection can be performed by the selection signal which is used to select a proper quantization characteristic and which is supplied through the signal line 1019.

The addition of the code length data is performed by an adder 80. The output code length data are not always added to each other. For example, if such thin-out as subsample or subline coding is performed by a switching circuit 21, the amount of the sum data of all the picture elements in the block apparently differs from the actual amount of the sum data of picture elements. This subsample or subline coding is performed in response to the gate signal supplied through the signal line 1021. The adder 80 determines whether or not all of the output signals from the code length generators 71 to 78 are added using the gate signal. Therefore, even if subsample or subline coding is performed, the proper data amount can be computed. The sum data corresponds to the amount of prediction error data per block and is supplied to the adder 143 through the signal line 1411.

The relationship between input and output signals with respect to the code length generators 71 to 78 will now be described. The difference signal is used as the input signal and the code length data or data approximately indicating the code length is used as the output data for illustrative convenience. If the code length is approximately measured, an output signal value is zero when a difference signal value falls within a range between 0 and 3. Similarly, an output signal value is 1 when a difference signal value falls within a range between 4 and 7; an output signal is 2 when a difference signal falls within a range between 8 and 11; an output signal is 3 when a difference signal falls within a range between 12 and 16; an output signal is 4 when a difference signal falls within a range between 17 and 22; an output signal value is 5 when a difference signal value falls within a range between 23 and 28; an output signal value is 6 when a difference signal value falls within a range between 29 and 34; and an output signal value is 7 when a difference signal value is not less than 35. It should be noted that the difference signal value indicates a negative or positive value when a unit level is 1/256, and that an output signal value is designated in units of bits. The relationship between the difference signal and the code length data can be determined for any other quantization characteristic in the same manner as described above.

Figure 4:
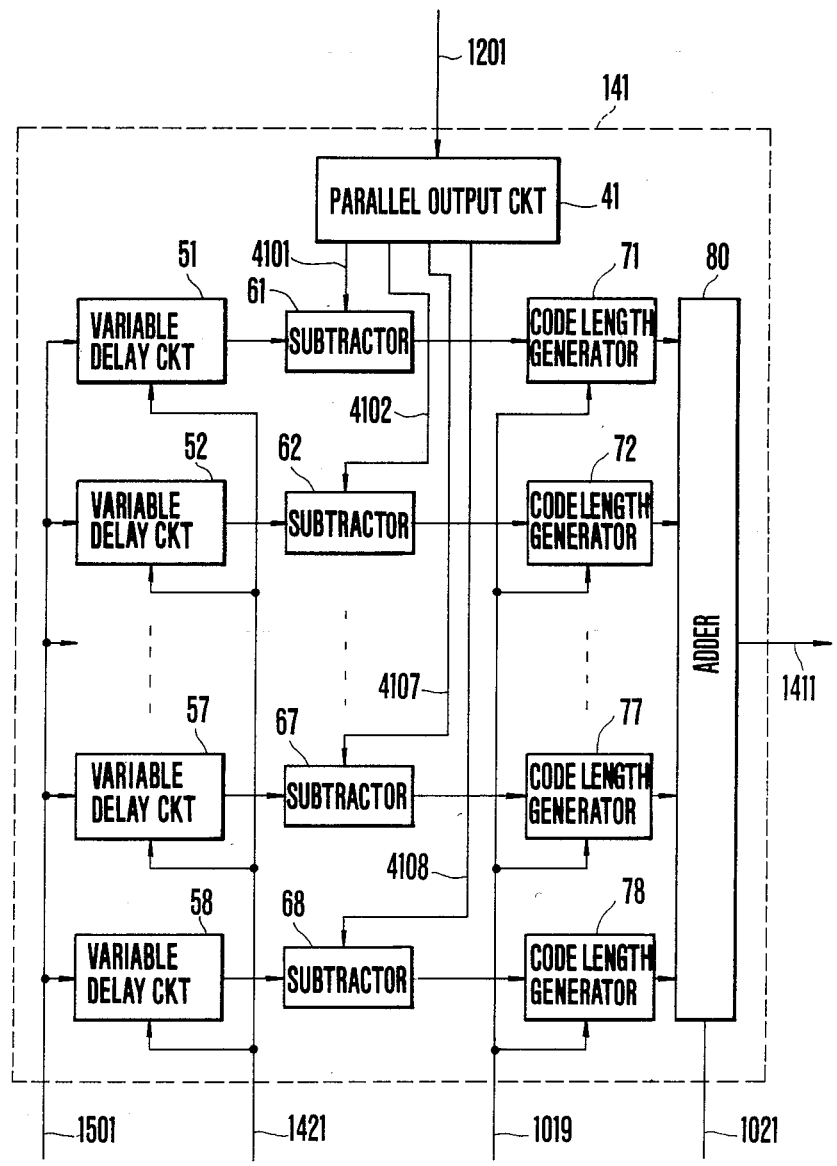
FIG. 4 is a block diagram of a prediction error data amount generator 141 shown in FIG. 3.
Figures 5, 6:
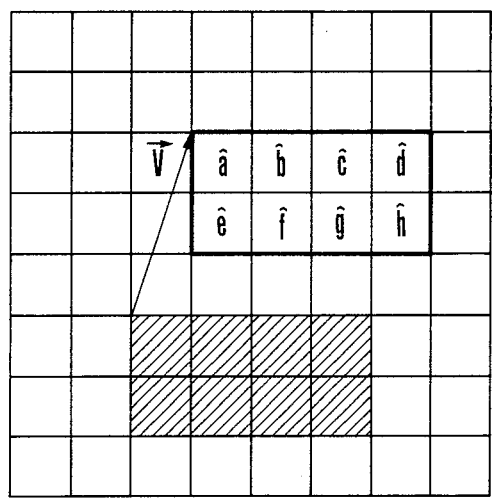
FIGS. 5 and 6 are tables for explaining the operation of the generator shown in FIG. 4.

The block has 8 picture elements (4 picture elements ×2 lines) with reference to FIG. 4. However, the number of picture elements of the block may not be limited. In general, a block may have m×n picture elements (m picture elements × n scanning lines). In this case, m×n variable delay circuits, m×n subtractors and m×n code length generators are required.

Figure 7:
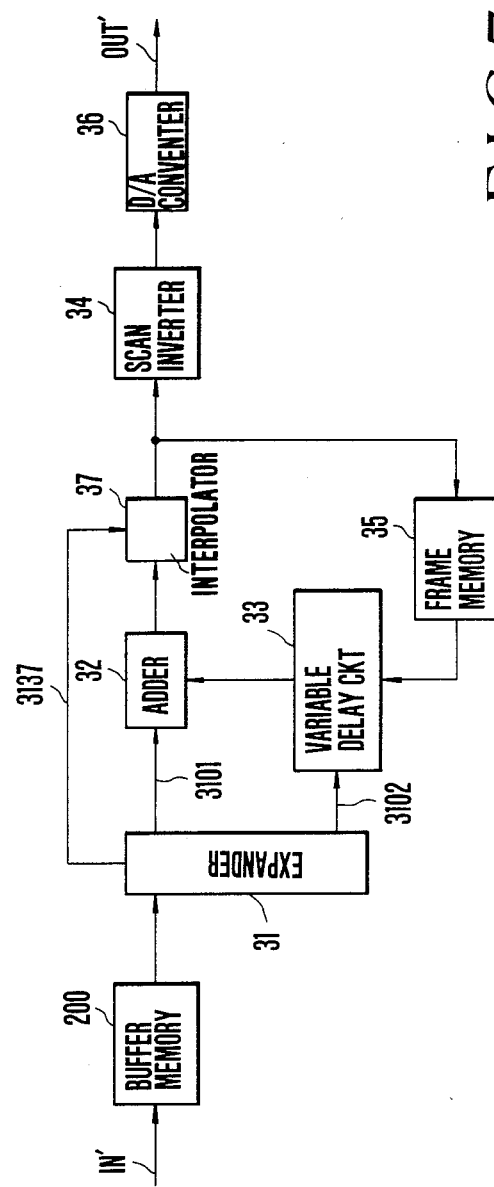
FIG. 7 is a block diagram of a predictive decoding apparatus to which data is transmitted from the adaptive predictive coding apparatus of the present invention.

A decoding apparatus which receives the transmitted data from the adaptive predictive coding apparatus will now be described according to the embodiment of the present invention with reference to FIG. 7.

The compressed coded data transmitted through a transmission line is supplied to a buffer memory 200 from an input line IN'. The buffer memory 200 is arranged to match the transmission rate and the decoding rate of the transmitted data. Data read out from the buffer memory 200 includes at least motion vector data, prediction error data, horizontal and vertical sync signals, and coding control mode data. An expander 31 expands and separates the data into the motion vector data and the corresponding prediction error data in accordance with the horizontal and vertical sync signals and the coding control mode data. The prediction error data is supplied to an adder 32 through a signal line 3101, and the motion vector data is supplied to a variable delay circuit 33 through a signal line 3102. The variable delay circuit 33 generates the prediction signal in response to the motion vector data. The adder 32 adds the prediction signal and the expanded prediction error data, and generates a decoded picture signal. The decoded picture signal is supplied via an interpolator 37 to a scan inverter 34 and a frame memory 35. The scan inverter 34 has a function opposite to that of the scan converter 1 of the coding apparatus (FIG. 2) and generates a television signal to be normally scanned. The output signal from the scan inverter 34 is supplied to a digital-to-analog converter 36. The D/A converter 36 converts the digital television signal to an analog television signal. The analog television signal is displayed on a television monitor through an output line OUT'. The variable delay circuit 33 and the frame memory 35 have the same arrangements as the variable delay circuit 16 and the frame memory 15 of the coding apparatus, respectively.

Figure 3:
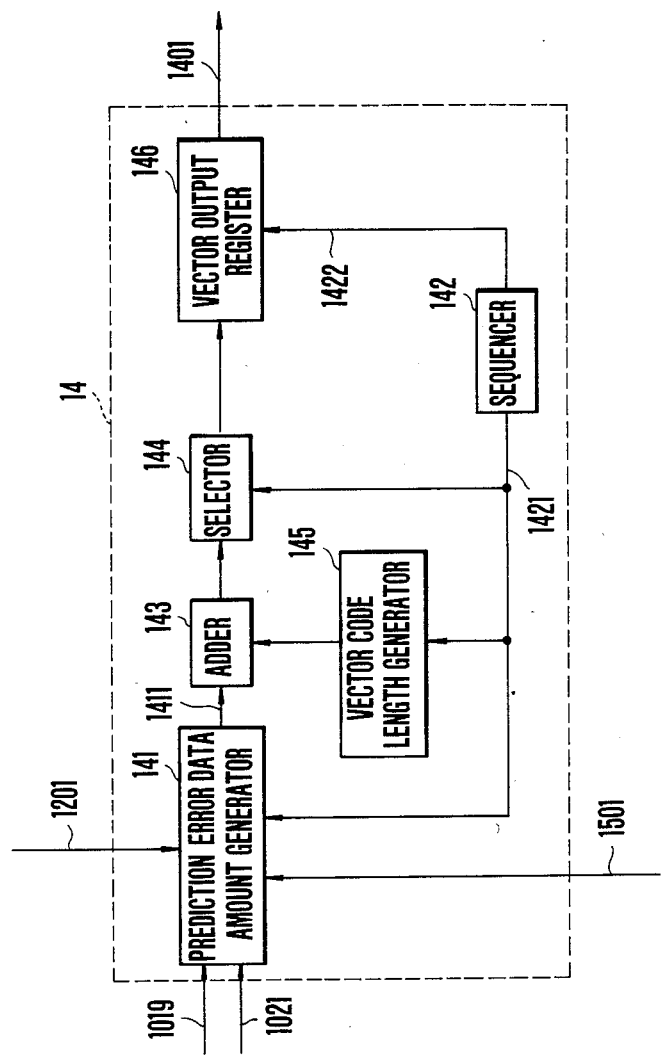
FIG. 3 is a block diagram of a motion vector output circuit 14 shown in FIG. 2.

In case of determining the motion vector in the adaptive predictive coding apparatus, if the prediction function is produced in one direction from the sequencer 142 shown in FIG. 3, it is assumed that all the prediction functions are used. However, another method can also be utilized. In particular, since similar motion vectors correspond to the optimum prediction function between two adjacent blocks, an output signal from the vector output register 146 may be supplied through the signal line 1401 and at the same time to the sequencer 142. The sequencer 142 then produces as a prediction function a signal which does not greatly differ from the motion vector, thereby decreasing the number of times of computation. Furthermore, still another method which resembles the above may be proposed. An output signal from the selector 144 may be supplied to the sequencer 142, and the sequencer 142 can then determine the prediction function to be produced in accordance with the output signal from the selector 144.

These modifications can be readily performed with a slight change in the circuit arrangement shown in FIG. 3. Predictive coding is performed for the motion vector data supplied through the line 1401; the process of obtaining this motion vector data does not limit the arrangement of the adaptive predictive coding apparatus of the present invention. Therefore, the arrangement of the apparatus need not be modified.

In the above embodiment, the code length data which indicates the prediction function and the code length data which indicates the prediction error data corresponding to this prediction function are added with respect to the picture elements in the block so as to detect the motion vector. However, the code lengths need not be precise but may be determined by an approximation.

In summary, the prediction function data and the predictive error data corresponding to this prediction function data are used to detect the motion vector (i.e., optimum prediction function) in the motion-compensated interframe prediction coding apparatus. The coding efficiency is greatly improved, thus providing a great advantage in a variety of practical applications.

What is claimed is:

1. An adaptive predictive coding apparatus for coding an input television signal so as to perform predictive coding by determining an optimum prediction function among a plurality of prediction functions for each of a plurality of blocks obtained by dividing up a frame of the input television signal, each of the blocks having a plurality of picture elements, and to perform selection of quantizing characteristic and coding control such as subline and subsample coding, the improvement wherein said apparatus comprises:
   first evaluating means for evaluating data necessary for representing a given prediction function of said plurality of prediction functions;
   second evaluating means responsive to the coding control, for evaluating data necessary for representing a prediction error amount per the block for the given prediction function;
   optimum prediction function output means for comparing sums of evaluated data produced from said first and second evaluating means, in respect of at least a portion of said plurality of prediction functions, for producing and selecting, on a block by block basis, one of the prediction functions which provides a minimal sum of evaluated data quantity to be transmitted as an optimum prediction function;

prediction coding means for effectuating predictive coding in accordance with the optimum prediction function to introduce a prediction error; and compressor means for compression coding of at least the data representative of said optimum prediction function and data representative of the prediction error produced from said prediction coding means in accordance with said optimum prediction function.

2. An adaptive predictive coding apparatus according to claim 1 wherein said first evaluating means comprises a vector code length generator for receiving prediction function data and generating a predetermined code length data.

3. An adaptive predictive coding apparatus according to claim 2 wherein said optimum prediction function output means comprises:

an adder connected to said first evaluating means and said second evaluating means so as to receive and add the predetermined code length data and the prediction error amount code; and a selector connected to said adder to receive present sum data, for comparing the present sum data with preceding sum data and for generating smallest sum data as the motion vector data.

4. An adaptive predictive coding apparatus for coding an input television signal so as to perform predictive coding by determining an optimum prediction function among a plurality of prediction functions for each of a plurality of blocks obtained by dividing up a frame of the input television signal, each of the blocks having a plurality of picture elements, and to perform selection of quantizing characteristic and coding control such as subline and subsample coding, the improvement wherein said apparatus comprises:

first evaluating means for evaluating data necessary for representing a given prediction of said plurality of prediction functions;

second evaluating means responsive to the coding control, for evaluating data necessary for representing a prediction error amount per the block for the given prediction function, wherein said second evaluating means comprises:

a parallel output circuit for receiving a picture signal;

a plurality of variable delay circuits each of which receives the prediction function data and the about one-frame delayed picture signal of a corresponding picture element and which produced the prediction signal of the corresponding picture element;

a plurality of subtractors respectively connected to said plurality of variable delay circuits and commonly connected to said parallel output circuit, each of said subtractors receiving the prediction signal of the corresponding picture element and picture element data corresponding thereto and producing a subtracted signal obtained by subtracting the prediction signal of the corresponding picture element from the picture element data;

a plurality of code length generators respectively connected to said plurality of subtractors, each of said code length generators receiving the subtracted signal from a corresponding one of said subtractors and the selection signal and producing a code length data; and an adder, commonly connected to said plurality of code length generators so as to receive code length data therefrom, for producing the prediction error amount code in response to the gate signal;

optimum prediction function output means for comparing sums of evaluated data produced from said first and second evaluating means, in respect of at least a portion of said plurality of prediction functions, for producing and selecting, on a block by block basis, one of the prediction functions which provide a minimal sum of evaluated data quantity to be transmitted as an optimum prediction function;

prediction coding means for effectuating predictive coding in accordance with the optimum prediction function to produce a prediction error; and compressor means for compression coding of at least the data representative of said optimum prediction function and data representative of the prediction error produced from said prediction coding means in accordance with said optimum prediction function.

5. An adaptive predictive coding apparatus according to claim 4 wherein said first evaluating means comprises a vector code length generator for receiving prediction function data and generating a predetermined code length data.

6. An adaptive predictive coding apparatus according to claim 4 wherein said optimum prediction function output means comprises:

an adder connected to said first evaluating means and said second evaluating means so as to receive and add the predetermined code length data and the prediction error amount code; and a selector connected to said adder to receive present sum data, for comparing the present sum data with preceding sum data and for generating smallest sum data as the motion vector data.

* * * * *